US008490522B1

(12) United States Patent
Bryan

(10) Patent No.: US 8,490,522 B1
(45) Date of Patent: Jul. 23, 2013

(54) WHEEL BEARING REMOVAL TOOL SYSTEM

(76) Inventor: Abrie Bryan, Brooklyn, NY (US)

( * ) Notice: Subject to any disclaimer, the term of this patent is extended or adjusted under 35 U.S.C. 154(b) by 301 days.

(21) Appl. No.: 13/071,207

(22) Filed: Mar. 24, 2011

(51) Int. Cl.
*B25B 13/48* (2006.01)
*B25B 13/56* (2006.01)
*B23P 19/04* (2006.01)

(52) U.S. Cl.
USPC .............. 81/176.15; 29/263; 29/264; 29/266; 29/259; 29/255; 29/244; 29/261

(58) Field of Classification Search
USPC ................. 81/176.15; 29/263, 264, 266, 259, 29/244, 261, 255
See application file for complete search history.

(56) References Cited

U.S. PATENT DOCUMENTS

| | | | | |
|---|---|---|---|---|
| 2,684,527 | A | 7/1954 | Hedlund | |
| 4,034,458 | A | 7/1977 | Ford et al. | |
| 5,165,169 | A * | 11/1992 | Boyce | 29/898.08 |
| 5,991,994 | A | 11/1999 | Crews | |
| 6,212,775 | B1 | 4/2001 | Sarver et al. | |
| 6,502,293 | B1 | 1/2003 | Khurana | |
| 6,539,601 | B1 | 4/2003 | Cloward | |
| 6,966,702 | B2 | 11/2005 | Phillips | |
| D594,718 | S | 6/2009 | Duffy | |
| 7,686,287 | B2 * | 3/2010 | Dixon et al. | 269/75 |
| 2002/0026701 | A1 * | 3/2002 | Klann | 29/259 |

OTHER PUBLICATIONS

Kelley, Malcolm E. , Bushing Removal Tool, United States Statutory Invention Registration, Registration date Sep. 6, 1994, Registration No. H1349.

* cited by examiner

*Primary Examiner* — Monica Carter
*Assistant Examiner* — Danny Hong

(57) ABSTRACT

A wheel bearing removal tool system comprising a dome structure, comprising a round bowl portion and a flat lip; a protrusion affixing the dome structure to a power drill, a plurality of recesses on the flat lip, a plurality of tool post, wherein the first post end comprises a complementary screw thread for screwing the tool posts into the plurality of recesses and affixing them to the flat lip.

5 Claims, 4 Drawing Sheets

WHEEL BEARING REMOVAL TOOL SYSTEM

BACKGROUND OF THE INVENTION

The present invention is directed to a wheel bearing removal tool system. The wheel bearing removal tool system of the present invention provides an easier and faster way of changing or replacing brake drums on busses or trucks.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
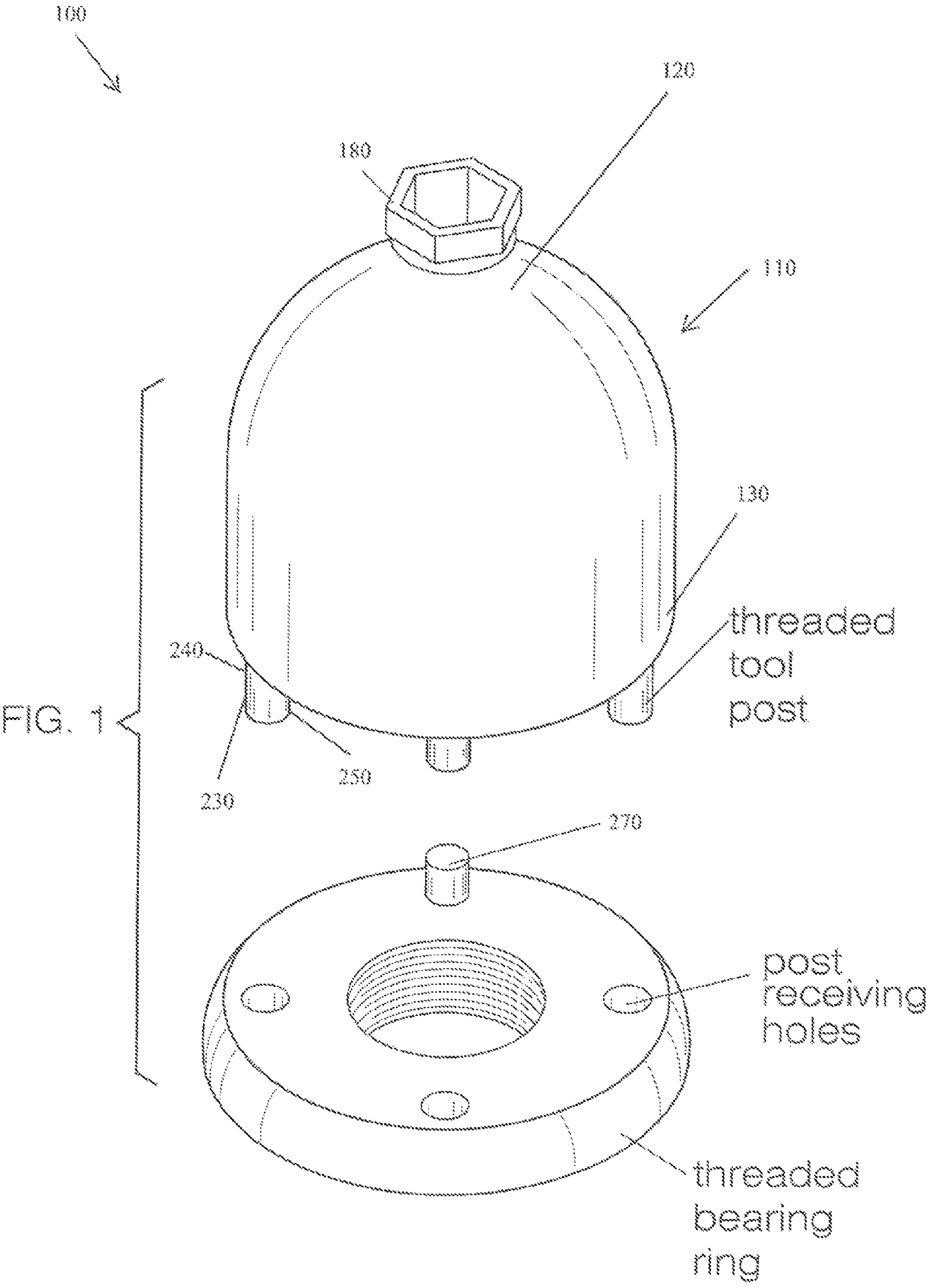
FIG. 1 shows a perspective view of a wheel bearing removal tool system.
Figure 2:
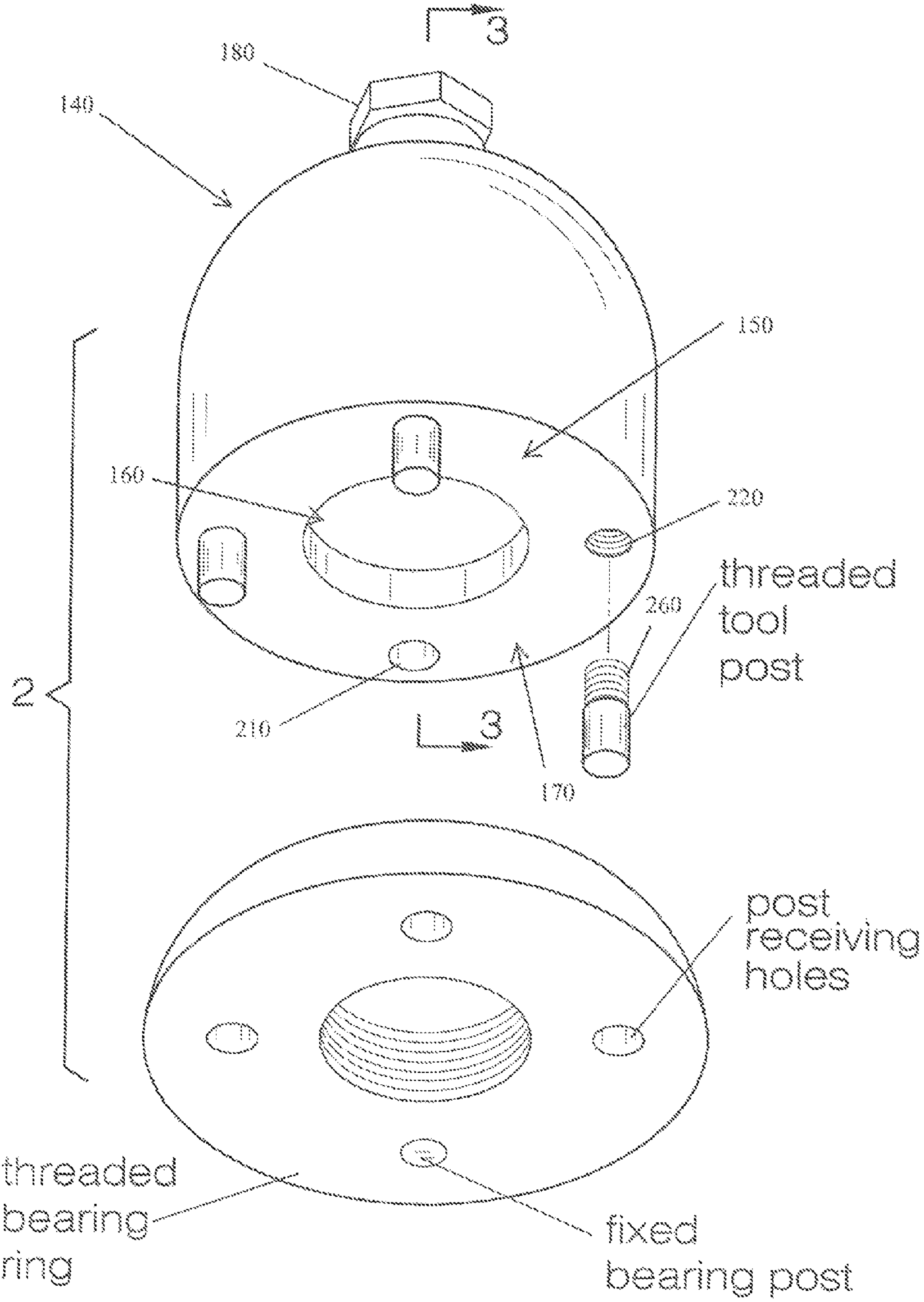
FIG. 2 shows another perspective view of a wheel bearing removal tool system
Figure 3:
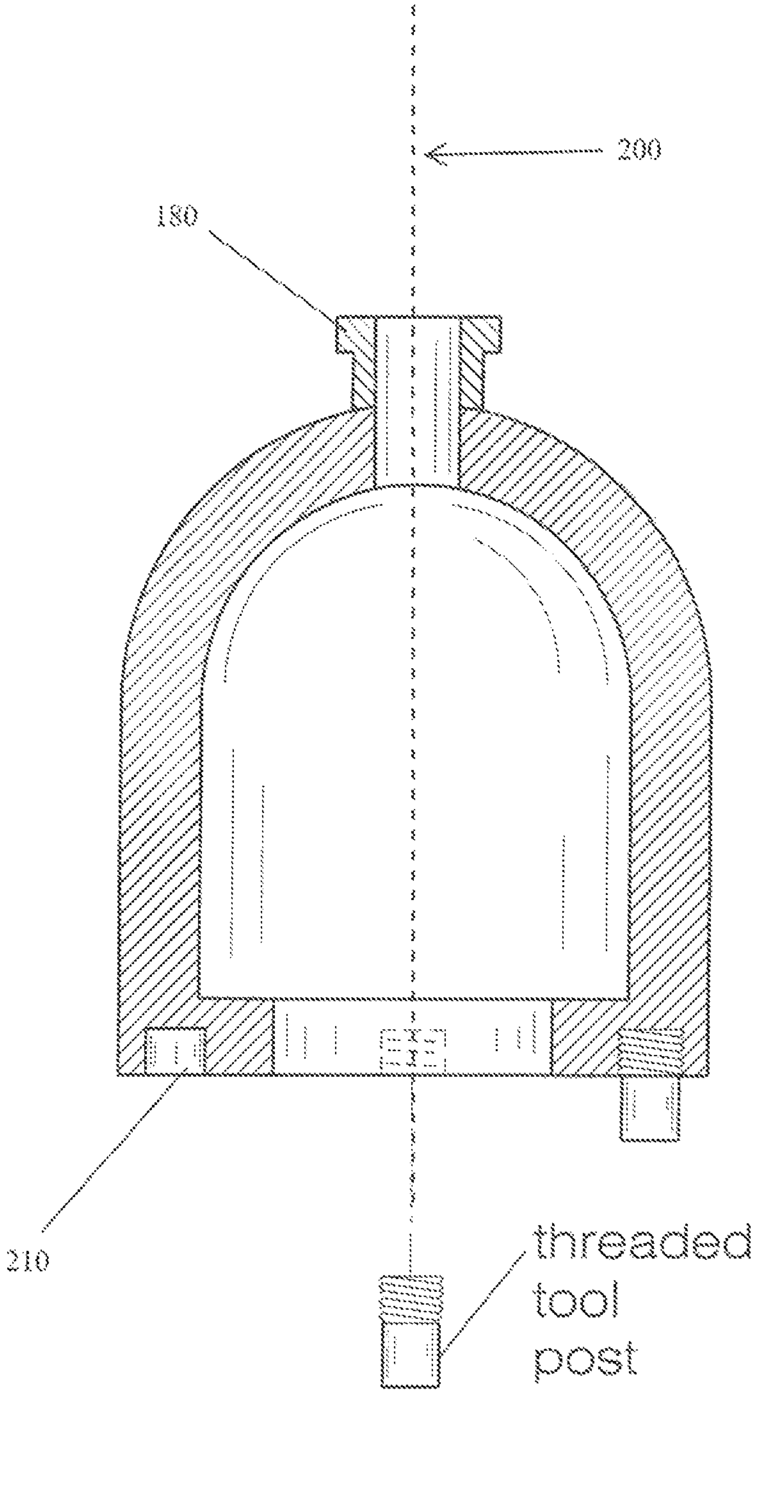
FIG. 3 shows a cross-sectional view of a wheel bearing removal tool system
Figure 4:
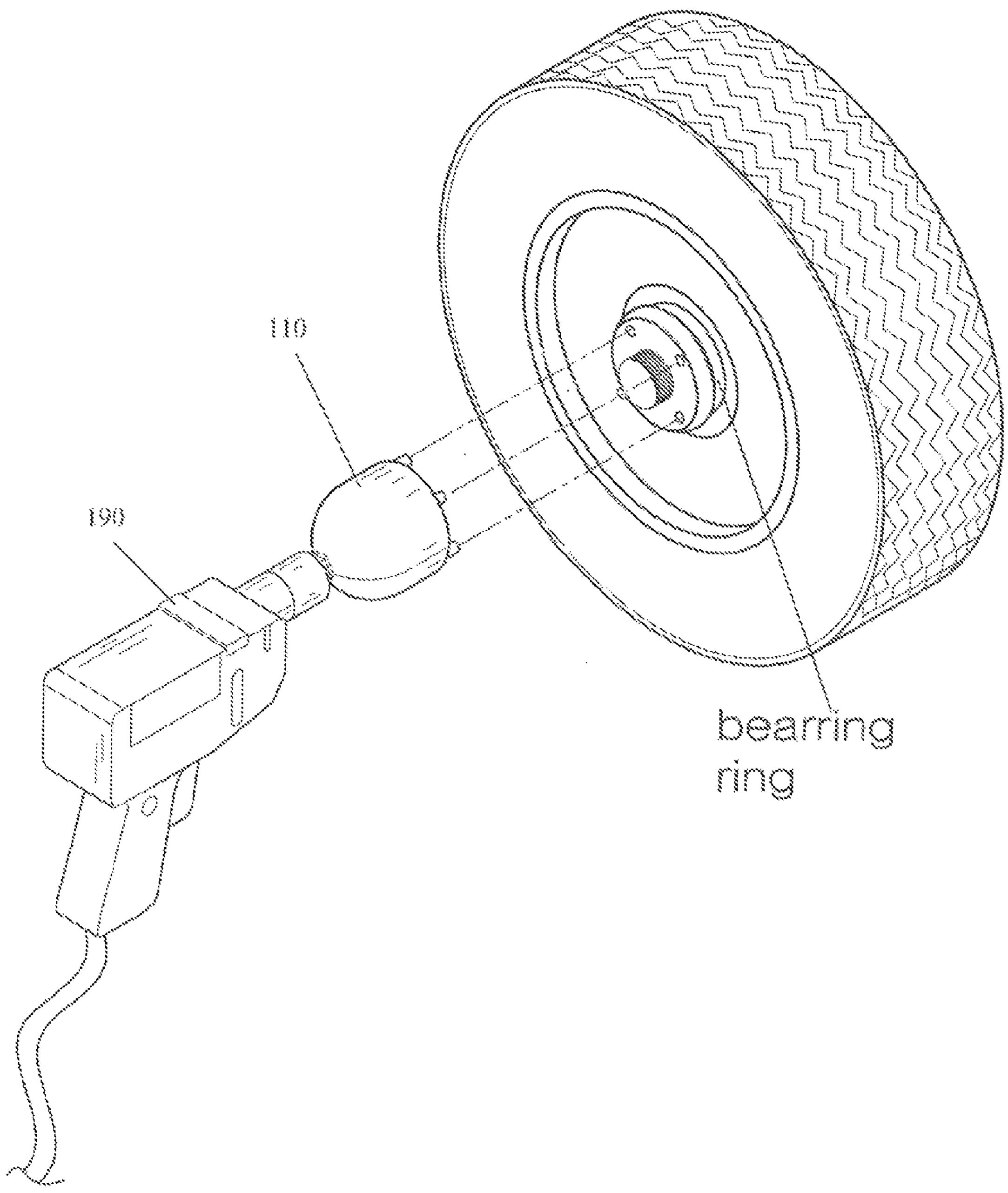
FIG. 4 shows another perspective view of a wheel bearing removal tool system in use.

Referring now to FIGS. 1-4, the present invention features a wheel bearing removal tool system 100 comprising a dome structure 110 having a first end 120 and a second end 130. The first end comprises a round bowl 140 portion of the dome and the second end comprises a flat lip 150, wherein the flat lip forms a ring structure 160 on a bottom surface 170 of the dome. The system further comprises a protrusion 180 is disposed atop the second end of the dome, the protrusion is for affixing the dome structure to a power drill 190, whereby the power drill spins the dome structure on a first axis 200.

The system further comprises a plurality of recesses 210 disposed on the flat lip, wherein at least one of the recesses has a screw thread 220 therein. The system further comprises a plurality of tool posts 230 having a first post end 240 and a second post end 250, wherein the first post end comprises a complementary screw thread 260 for screwing the tool posts into the plurality of recesses and affixing them to the flat lip. This system makes it easier and faster to remove and attach a wheel bearing. The tool posts are easily replaceable if they brake, which it makes it better, easier and cheaper than having to replace the entire tool.

In some embodiments the inside of the bowl is hollow.

In some embodiments at least one of the recesses does not have a screw thread 220 therein, and wherein such recess without the screw thread functions to receive a fixed bearing post 270 of a bearing ring 280. In some embodiments there are four recesses evenly distributed around the flat lip of the dome structure. In some embodiments there are four recesses evenly distributed around the flat lip of the dome structure, and wherein three of them have a screw thread 220 therein for receiving three tool posts that have a complementary screw thread 260.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A wheel bearing removal tool system 100 comprising:

(a) a dome structure 110 having a first end 120 and a second end 130, the first end comprises a round bowl 140 portion of the dome and the second end comprises a flat lip 150, wherein the flat lip forms a ring structure 160 on a bottom surface 170 of the dome;

(b) a protrusion 180 disposed atop the second end of the dome, the protrusion is for affixing the dome structure to a power drill 190, whereby the power drill spins the dome structure on a first axis 200;

(c) a plurality of recesses 210 disposed on the flat lip, wherein at least one of the recesses has a screw thread 220 therein;

(d) a plurality of tool post 230 having a first post end 240 and a second post end 250, wherein the first post end comprises a complementary screw thread 260 for screwing the tool posts into the plurality of recesses and affixing them to the flat lip.

2. The system of claim 1 wherein the inside of the bowl is hollow.

3. The system of claim 1 wherein at least one of the recesses does not have a screw thread 220 therein, and wherein such recess without the screw thread functions to receive a fixed bearing post 270 of a bearing ring 280.

4. The system of claim 1 wherein there are four recesses evenly distributed around the flat lip of the dome structure.

5. The system of claim 1 wherein there are four recesses evenly distributed around the flat lip of the dome structure, and wherein three of them have a screw thread 220 therein for receiving three tool posts that have a complementary screw thread 260.

* * * * *